No. 786,756. PATENTED APR. 4, 1905.
T. S. GRIMES.
ROTARY PRESS.
APPLICATION FILED AUG. 16, 1904.

No. 786,756. PATENTED APR. 4, 1905.
T. S. GRIMES.
ROTARY PRESS.
APPLICATION FILED AUG. 16, 1904.

Witnesses
J. L. McCabe
W. Max Duvall

Inventor
T. S. Grimes
Wilkinson & Fisher
Attorneys

No. 786,756.

Patented April 4, 1905.

UNITED STATES PATENT OFFICE.

THADDEUS S. GRIMES, OF ATLANTA, GEORGIA.

ROTARY PRESS.

SPECIFICATION forming part of Letters Patent No. 786,756, dated April 4, 1905.

Application filed August 16, 1904. Serial No. 220,949.

*To all whom it may concern:*

Be it known that I, THADDEUS S. GRIMES, a citizen of the United States, residing at Atlanta, in the county of Fulton and State of Georgia, have invented certain new and useful Improvements in Rotary Presses; and I do hereby declare the following to be a full, clear, and exact description of the invention, such as will enable others skilled in the art to which it appertains to make and use the same.

My invention relates to improvements in rotary presses, and is especially designed for expressing the oil from cotton-seed meats, but is also well adapted for expressing liquids from solids of various kinds.

The present application covers improvements upon my prior patent, No. 675,776, dated June 4, 1901, the object of this invention being to specifically improve upon the construction set forth therein.

My invention consists in the novel construction and combinations of parts, as hereinafter described and claimed.

In the accompanying drawings.

Figure 1:
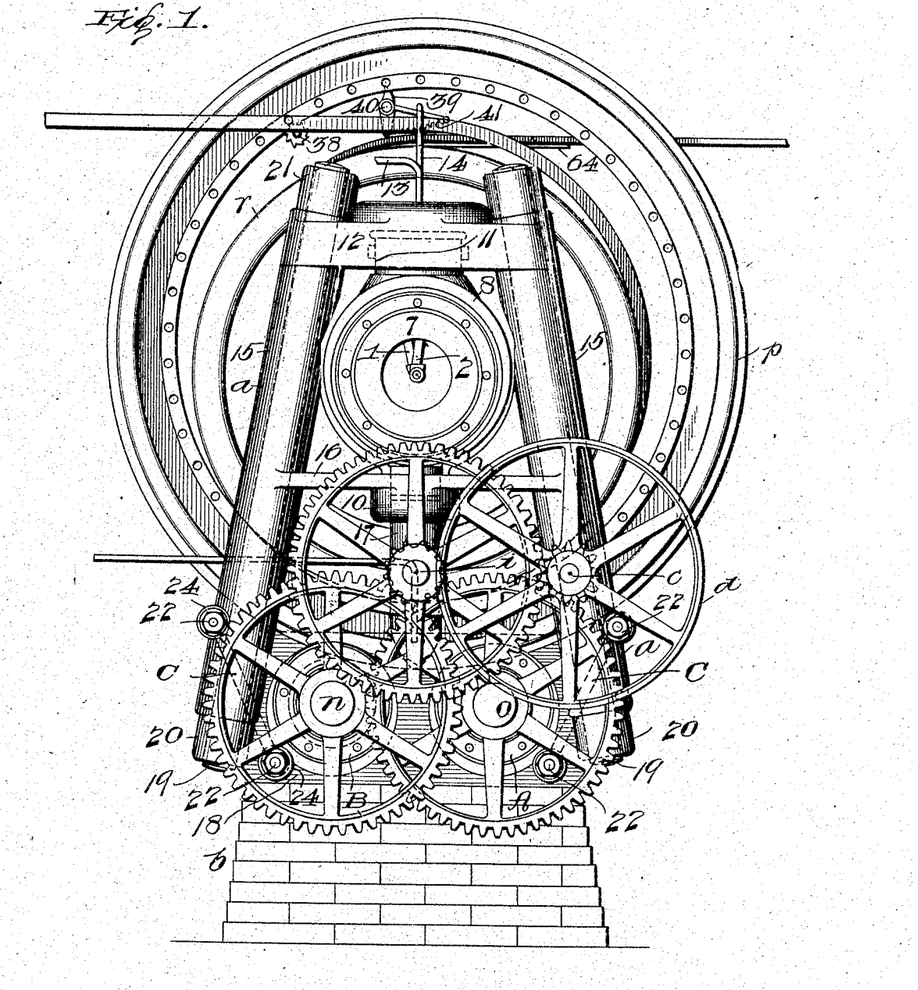
Figure 1 is a side elevation of my rotary press.
Figure 2:
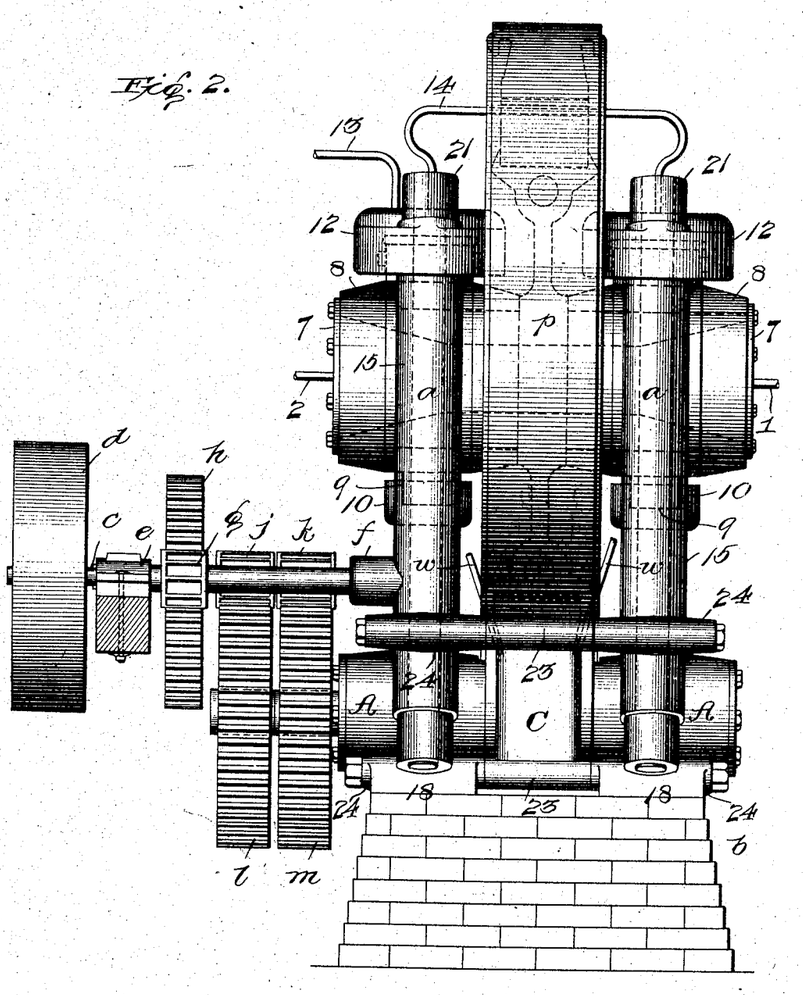
Fig. 2 is an end view of the same.
Figures 3, 4:
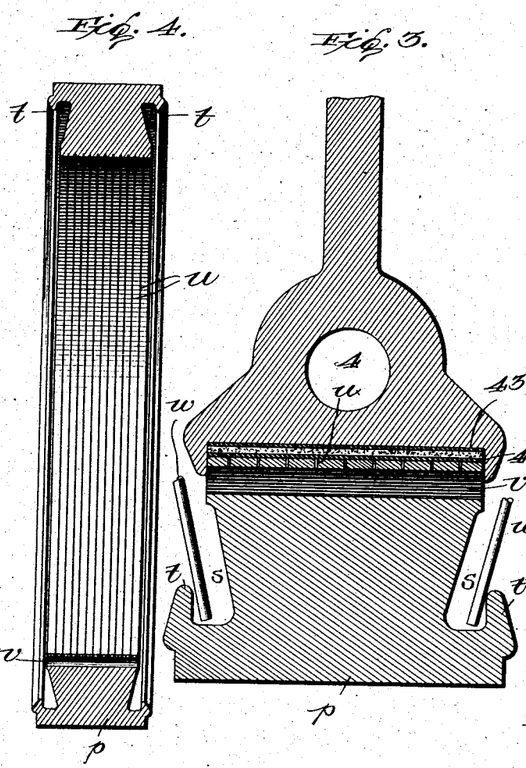
Fig. 3 is a cross-section of a portion of the pressure-wheel and the eccentric ring surrounding the same.
Fig. 4 is a cross-section of said ring.
Figure 5:
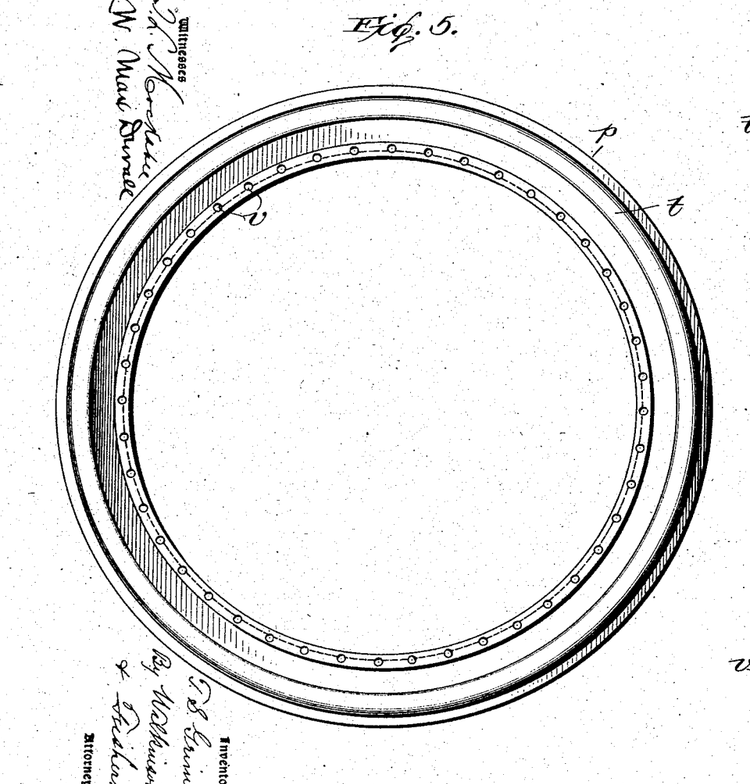
Fig. 5 is a side view of said ring.

The press is supported in a strong braced frame $a$, which rests on a support $b$, of masonry or other suitable material. The general construction of the machine is best shown in Figs. 1 and 2, in which $c$ represents the driving-shaft, provided with a driving-pulley $d$, which shaft is mounted in fixed bearings $e$ and $f$. This shaft is provided with a pinion $g$, which meshes with a large gear-wheel $h$ on the shaft $i$. This shaft carries two pinions $j$ and $k$, which mesh, respectively, with the gear-wheels $l$ and $m$, located on the shafts $n$ and $o$, respectively. These shafts are enlarged to form roller-supports for the pressure-ring $p$, and, if desired, additional idle rollers may be used. The pressure-ring $p$ is driven by frictional contact with the rollers $n$ and $o$, although of course this ring might be provided with external gear-teeth engaging gear-teeth on the shafts $n$ and $o$. The pressure-wheel $r$ is also revolved by frictional contact with the material between it and the ring $p$, this wheel being located eccentrically in said ring. The ring is best shown in Figs. 3, 4, and 5. It is provided with troughs $s$, one on each side, which are formed by the flanges $t$. These flanges may be either cast integral with the ring or may be made of separate pieces bolted thereto, as desired. The inner surface of the ring is provided with a series of grooves $u$, not arranged exactly parallel to the sides of the ring, for a purpose hereinafter explained. These grooves may be cut spirally, if desired, deep enough to intersect the holes $v$. These grooves $u$ communicate with transverse holes $v$ and are for the purpose of allowing the oil to escape from the space between the pressure-wheel and the ring and to collect in the troughs $s$, from which it is drawn out through the pipes $w$ by means of any suitable suction apparatus.

Figure 6:
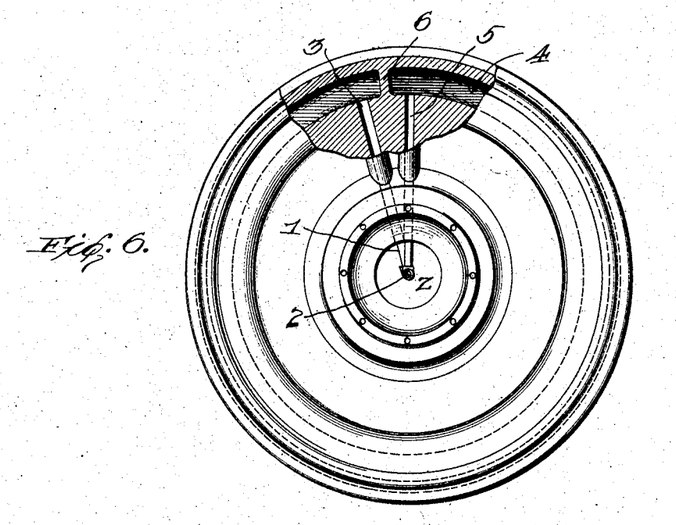
Fig. 6 is a side view, partly in section, of the pressure-wheel.
Figure 7:
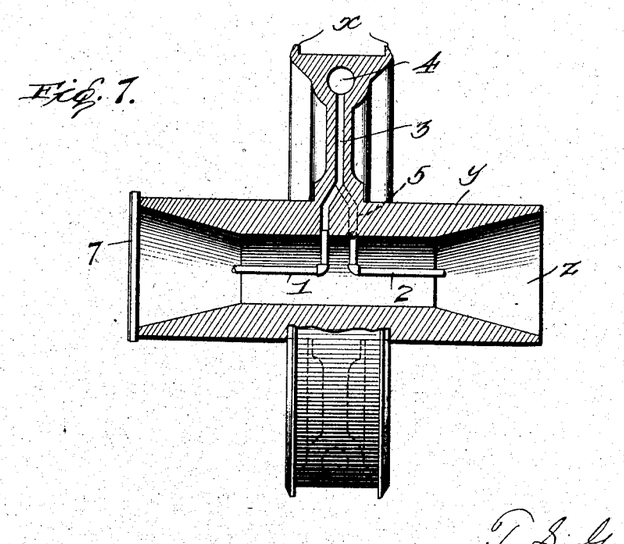
Fig. 7 is a cross-section of the same.

The pressure-wheel is best shown in Figs. 6 and 7. It is made of heavy material, preferably cast-iron or steel, and is provided on its outer edge with flanges $x$, which are adapted to fit over the inner edge of the ring $p$, as shown in Fig. 3, which therefore serves as a guide for said wheel, which is held down by its own weight and means hereinafter described. The wheel is provided with an extended central bearing $y$, which is hollowed out, as shown at $z$, for the sake of making it lighter and to afford space for the introduction of the steam inlet and exhaust pipes 1 and 2, these pipes being connected by any suitable slip-joints (not shown) with supply and discharge pipes. The pipe 1 communicates with the radial passage 3, cored out in the wheel, which passage communicates with an annular passage 4, cored out of the wheel and parallel to its circumference, thus furnishing a means by which the pressure-wheel is always kept hot. The discharge-pipe 2 communicates with the radial passage 5, which in turn communicates with the passage 4. This annular passage 4 does not extend completely around the wheel, being stopped by a partition 6. Instead of having the passages 3, 4, and 5 cored out pipes may be cast in the wheel structure during the process of making it.

The central bearing $y$ is closed at each end by a cap 7, bolted thereto, which caps are perforated for the passage of the steam-pipes, as shown in Fig. 2. The bearing $y$ is supported in strong journal-boxes 8, movably supported between the legs of the frame $a$. The lower part of each of the bearings 8 is extended downwardly, as shown in dotted lines at 9 in Fig. 2, and enters the cup-shaped portion 10 (see Figs. 1 and 2) of the main frame. Thus the downward motion of the journal-boxes 8 is limited. The upper part of each of the journal-boxes is enlarged to form a piston 11, (shown in dotted lines in Fig. 1,) which fits into a chamber in the head-block 12, which forms a part of the main frame $a$. A pipe 13 supplies hydraulic pressure to the chamber in one of the head-blocks 12, and a pipe 14 connects these two head-blocks together, so that the pressure on both of the journal-boxes is the same.

The supporting-frame $a$, Fig. 1, is constructed in the following manner: It consists of two cylindrical portions 15 15, united by a cross-brace 16, and in this cross-brace is located the cup-shaped portion 10, already referred to. Below the cup-shaped portion runs a pillar 17, terminating in a heavy metal casting 18, resting on the support $b$. There are two of these castings 18, one located on each side of the support $b$, and to these castings are attached the cylindrical portions 15, which may be made integral therewith or secured thereto in any desired manner. In these castings are two large bearings A and B, which carry the two shafts $n$ and $o$. On the top of the two inclined cylindrical portions 15 rests the head-block 12, and through the head-block and through the cylindrical portion run stout rods 19, screw-threaded at each end and adjustably secured by nuts 20 and 21. The two sides or frame of the machine are kept in proper relative position to each other by longitudinal bolts 22, Figs. 1 and 2, passing through supports 24, formed on cylindrical portions 15, and the braces or space-bars C, provided with sleeves 23, the whole constituting a strongly-braced and economically-assembled frame.

Figure 11:
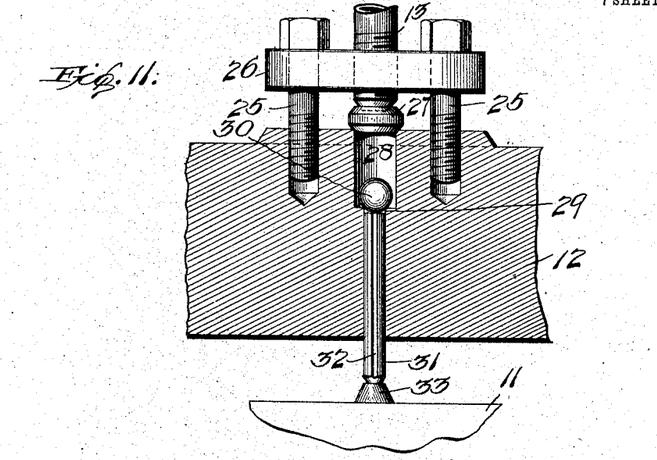
Figs. 11 and 12 are cross-sections showing details of the head-block.
Figure 12:
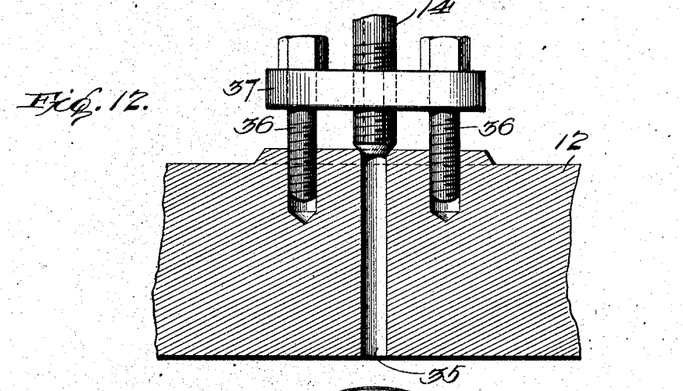
Figure 13:
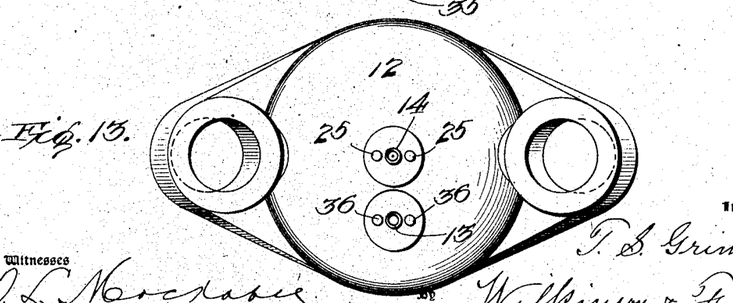
Fig. 13 is a top plan view of one of the head-blocks.

To keep the pressure-wheel $r$ down against the material under treatment during the operation of pressing, oil or other liquid is forced in through the pipe 13 into the head-block, thereby transmitting a downward pressure upon the journal-boxes 8 of the pressure-wheel. By means of the pipe 14 the pressure is transferred from one head-block to that on the opposite side of the press, thereby equalizing the downward pressure. The connections for the hydraulic means are shown on an enlarged scale in Figs. 11 and 12. The top of the head-block 12 is bored out for the reception of the bolts 25, which pass through a cross-head 26 and into the top of the head-block 12. The inlet-pipe 13 for the oil or other fluid which supplies fluid-pressure is screw-threaded through the cross-head 26 and rests upon the end of a perforated washer 27, (provided with packing, if desired,) which washer fits over the top of a hole 28, bored out in the top of the head-block 12, which communicates with another smaller opening 29, which, with the opening 28, forms a continuous passage through the top of the head-block 12. A ball 30 is loosely mounted in the passage 28, and a pin 31, provided with a groove 32, is loosely mounted in the passage 29. The lower part of this pin is tapered off and rests on the projection 33, carried by the piston 11, (shown in dotted lines in Fig. 1,) which piston forms an upward projection on the journal-box 8. The connection for the pipe 14 to the upper part of the head-blocks 12 is similar to that already described, except that the head-block is provided with a passage 35 of the same size throughout, with which the pipe 14 directly communicates. The pipe 14 is screw-threaded through a head-piece 37, which is secured by bolts 36 to the top of the head-block 12. The object of this construction is to secure uniform downward pressure upon both the journal-boxes of the pressure-wheel and also to prevent the wheel from being forced down by the fluid-pressure too close to the ring $p$. The ball 30 rests on the grooved pin 31, which pin in turn is supported by the projection 33. The groove 32 in the pin 31 allows a free flow of the oil or other liquid between the passage 28 and the space between the head-block 12 and the piston 11 of the journal-box 8 under ordinary conditions. The length of the pin or plunger 31 is such that when the compression-surface of the pressure-wheel is as near as desired to the compression-surface of the ring the ball 30 rests on the shoulders at the bottom of the passage 28, which form a seat for said ball. In this position it automatically cuts off the hydraulic pressure through the pipe 13 from the head-blocks, and the wheel will rest upon the cloths which carry the material to be treated; but its weight is not sufficient to injure them. When, however, the material is fed in between the cloths and these cloths are fed in between the pressure-wheel and ring, the wheel is forced up, carrying the pin or plunger 31 with it until it lifts the ball 30 off its seat. When this is done, the fluid-pressure is restored in both head-blocks through the pipes 13 and 14, and the desired pressure is put back upon the pressure-wheel.

The pressure used is so great that it would seriously injure the cloths, or even cut them in two, if the weight of the wheel reinforced by the hydraulic pressure were allowed to bear against said cloths without any material between them. The automatic cutting off of the hydraulic pressure by means of the ball 30, as already described, is generally sufficient to take all pressure and strain off the machine when not actually used for expressing oil and to prevent the cutting of cloths, as above indicated; but to make it doubly sure that the cloths will not be cut the downward motion of the pressure-wheel is limited by the projections 9 on the journal-boxes 8, which projections, as already described, fit into the cup-shaped portions 10, whereby the downward movement of the pressure-wheel is limited. If, therefore, there should be a leak around the ball 30, by reason of its being imperfectly seated or for any other reason, the downward movement of the pressure-wheel is stopped at a certain fixed point, so that the cloths will not be cut or injured.

Figures 9, 10:
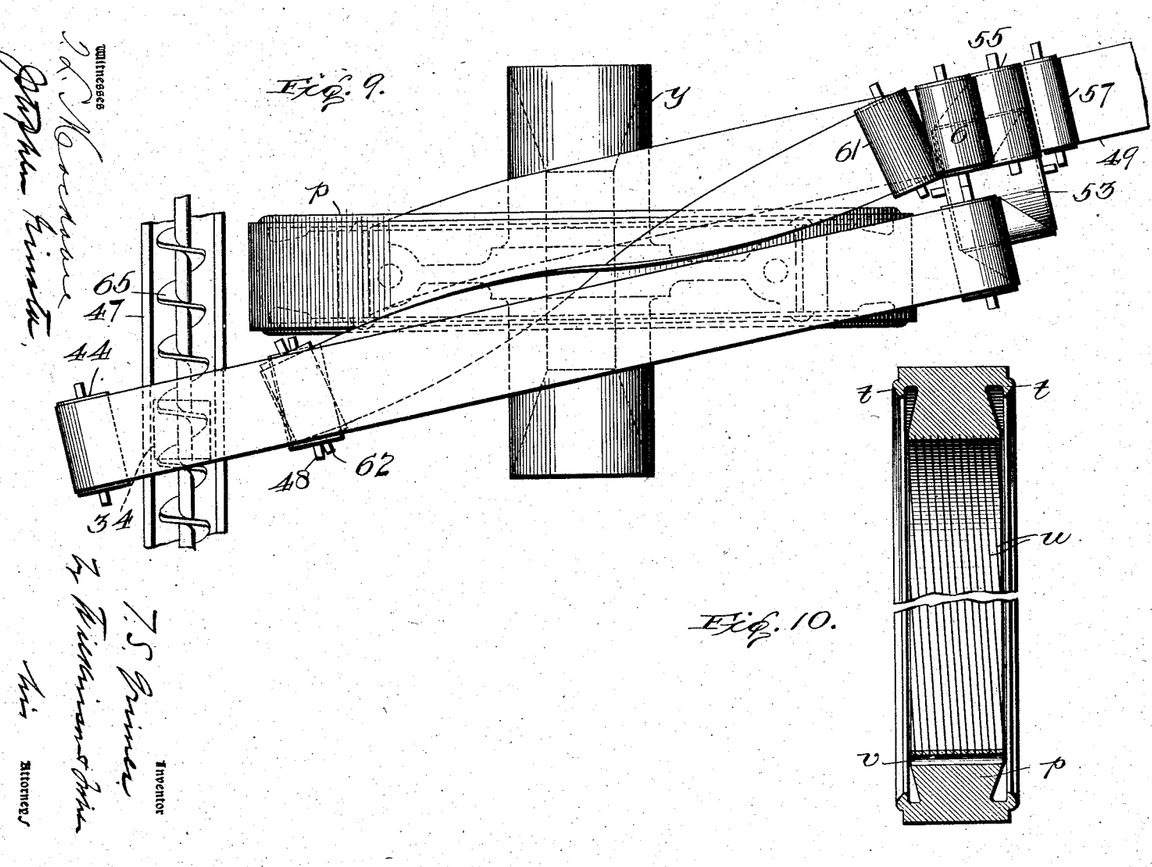
Fig. 9 is a plan view of the same.
Fig. 10 is a sectional view of the interior of the pressure-ring, showing the continuous spiral groove.

In my previous patent, already referred to, I use one cloth to convey the material to be treated, which cloth was folded over the top of the cotton-seed meats or other material, so as to completely inclose it. In my present invention, however, I use two endless cloths, thus obviating the necessity of folding the cloth, which is objectionable in that the cloth where it is folded would soon become worn, whereas by my present arrangement the cloths will last much longer. For the purpose of preventing undue wearing of the cloths under the great pressure the grooves $u$ in the ring $p$ are not made parallel with the edges of said ring, but at a slight angle thereto, but perpendicular to the inner surface of the ring, so that the downward pressure of the pressure-wheel causes fresh portions of the cloth to come in contact with these slots as the cloths are drawn through the machine. This equalizes the wear upon the cloths and makes them last much longer. Instead of having parallel grooves, such as shown at $u$ in Fig. 4, I may of course use a series of perforations connecting holes $v$ with compression-surface of ring $p$; but in such case the perforations would of course be arranged in spiral rows to equalize the wear on the cloths, as already described, or a continuous spiral groove may be used, as shown in Fig. 10.

It occasionally happens that small particles of the material under treatment are forced by the great pressure through the cloth and lodge in the grooves $u$, stopping them up, and in Fig. 1 I have shown two means for clearing out these grooves, which means may be used together or separately, as desired. The first consists of toothed revolving cutters 38, which engage with the grooves $u$ and are revolved by any suitable means (not shown) to clear out these said grooves. The second means is a series of teeth 39, mounted on a support 40 and each controlled by a spring 41, the point of each tooth 39 engaging in one of the slots $u$. The teeth 39 of course must be mounted on the support 40 so that they can slide thereon a short distance, since the grooves $u$ are not precisely parallel to the edge of the pressure-ring, and the same is true, of course, of the revolving cutters 38.

Figures 8, 14:
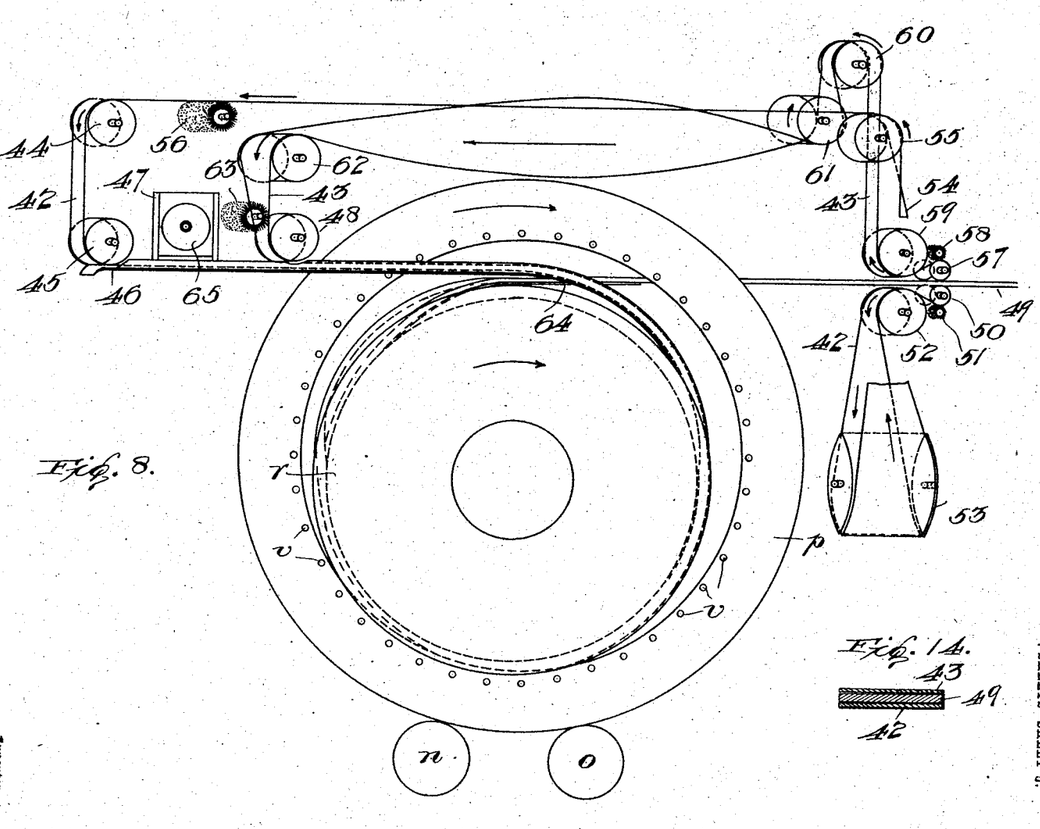
Fig. 8 is a diagrammatic view showing the arrangement of the press-cloths.
Fig. 14 is a cross-section showing the carrying-cloths and compressed cake between them.

The arrangement and operation of the carrying-cloths will next be described, special reference being had to Figs. 8, 9, and 1.

42 represents the lower endless carrying-cloth, and 43 represents the upper carrying-cloth. The lower carrying-cloth passes over pulleys 44 and 45 and then enters the trough 46, which is curved so as to nearly enter the space between the flanges $x$ of the pressure-wheel. The material is fed upon the cloth 42 through a hole 34 in the bottom of a conveyer-trough 47, which is provided with a spiral conveyer 65, operated in any suitable manner. The upper cloth 43, passing over the pulley 48, meets the lower cloth, thus inclosing the material between the two cloths, the whole being then fed along into the space between the flanges $x$ of the pressure-wheel and down between said wheel and the ring $p$, whereby the oil is extracted, and then the whole, including the two cloths and the pressed material, is delivered out of the press, the pressed material passing out in a long thin cake 49, which is delivered into any suitable receptacle. The lower cloth 42 passes over the guide-pulley 50, and one side of it is cleaned by the revolving brush 51. It then passes over the pulley 52, the pulley 53, and is then turned, as shown at 54, passing over the pulley 55 and back again over the pulley 44, the other side of the cloth being cleaned by a revolving brush 56. Similarly, the upper endless cloth 43 passes over the pulley 57, one side thereof being cleaned by a revolving brush 58, pulleys 59, 60, 61, and 62, back to the pulley 48, the other side of the cloth being cleaned by the brush 63 before it reaches the pulley 48. Between the pulleys 61 and 62 the cloth 43 is turned, as shown in Figs. 8 and 9.

The reason for turning the cloth 42 after each passage through the press is for the purpose of making it wear evenly and keeping it clean, as the oil will be forced through it first from one side and then from the other. The cloth 43 is also turned over after each passage through the press in order that it may wear more evenly.

Owing to the great pressure exerted, the two cloths have a slight tendency to stick between the flanges $x$, and I therefore prefer to employ a curved plow 64, (shown in Figs. 1 and 8,) which projects downwardly into the groove between the flanges $x$ and lifts the cloths and inclosed cake out of said groove and at the same time guides them sidewise out of the press, as shown in Fig. 9, the cloths being fed in at an angle to said wheel, as also shown in said figure.

The pulleys 44 and 45 are driven in the usual way, carrying the cloth 42 and also the pulleys 62 and 48, which carry the cloth 43. The pulleys 50, 57, 52, 59, 55, and 61 are driven by the usual means and slightly faster than the rate of the travel of the cloths 42 and 43 out of the press, the pulleys 53 and 60 being merely guide-pulleys, but mounted in vertically-adjustable bearings, so that any slack in the cloths may be taken up. These pulleys at the discharge end of the machine are driven at a faster rate than the travel of the cloth to insure the proper stripping of the cloths from the cake and also to make sure that the cloths containing the cake as they come out over the plow 64 never get slack. Owing to this excess of speed, the cloths slip slightly on these pulleys, and therefore a pull is exerted on the cloths. The pulleys 44, 45, 48, and 62 may be driven by any suitable means of transmission, as already said, or may be driven by the cloths themselves.

While I have thus described my invention, I wish it to be distinctly understood that I do not limit myself to the exact details shown and described, as they might be varied considerably without departing from the spirit of my invention. For instance, instead of the grooves $u$ a series of holes could be used; instead of having the ring $p$ driven by frictional contact it might be driven by positive gearing; instead of the particular arrangement of guide and driving-pulleys shown in Fig. 9 obviously many other arrangements could be made, and I wish it to be distinctly understood that I do not limit myself to any particular arrangement of the pulleys or to any particular manner in which the cloths are fed into and out of the press. Furthermore, it will be obvious that all the bearings might be provided with antifriction devices, as shown in my previous patent, and that packings and union joints might be used for the steam and fluid-pressure pipes wherever desired, these being details obvious to any one skilled in this art.

The particular advantages of my present invention as an improvement over my prior patent is that the pressure-wheel is always heated, which is a great advantage, especially in cold weather. Another advantage is that by the arrangement of the discharge-grooves in the inner surface of the pressure-ring the cloths wear more uniformly and cutting thereof is prevented. Again, the arrangement whereby the cloths are turned after each passage through the machine and cleaned is a valuable improvement, as this causes a more uniform wear of the cloths and insures better drainage. The use of two endless cloths instead of one, which obviates folding, also obviates wear. In addition the specific means for supplying hydraulic pressure and for automatically preventing the pressure-wheel from coming in absolute contact with the pressure-ring, which would be likely to cut or damage the cloths, is a great advantage.

Having thus described my invention, what I claim as new, and desire to secure by Letters Patent, is—

1. In a rotary press, the combination of a pressure-wheel having a grooved periphery, a ring encircling said wheel eccentrically, the inner face of said ring being adapted to enter the groove in said wheel, means for forcing said wheel toward said ring, automatically-operating means for preventing said wheel from being forced into actual contact with said ring, and means for conveying material into the space between said wheel and ring, substantially as described.

2. In a rotary press, the combination with a grooved wheel having central bearings, of a ring encircling said wheel eccentrically, two parallel endless cloths for conveying the material into the space between said wheel and ring, and means for rotating said wheel and ring, substantially as described.

3. In a rotary press, the combination with a grooved wheel having central bearings and means for heating the same, of a ring encircling said wheel eccentrically, parallel endless cloths for conveying the material into the space between said wheel and ring, and means for rotating said wheel and ring, substantially as described.

4. In a rotary press, the combination with a grooved wheel having a peripheral pressure-surface, of a ring encircling said wheel eccentrically and having an inner pressure-surface, parallel endless cloths for conveying the material into the space between said wheel and ring, a guide for said cloths as the material is fed to the press, means for disengaging said cloths and the pressed material from said wheel after the pressing operation, and means for rotating said wheel and ring, substantially as described.

5. In a rotary press, the combination with a grooved wheel, ring, and means for heating said wheel, of endless cloths for containing the material as it passes between said wheel and ring, means for guiding said cloths into the space between said wheel and ring, means for disengaging said cloths from said wheel after the pressing operation, and means for rotating said wheel and ring, substantially as described.

6. In a rotary press, the combination with a wheel having a grooved peripheral pressure-surface, of a ring encircling said wheel eccentrically and engaging the groove in said wheel, said ring having a pressure-surface upon its inner circumference, movable bearings for said wheel, means for increasing the pressure between said ring and wheel, and means for automatically cutting off said pressure, substantially as described.

7. In a rotary press, the combination with a wheel having a grooved peripheral pressure-surface and means for heating said wheel, of a ring having apertures upon its inner face, said ring encircling said wheel, parallel endless cloths, means for feeding the material to be treated between said cloths, means for directing said cloths and material into the space between said wheel and ring, and means for pressing said wheel toward said ring, substantially as described.

8. In a rotary press, the combination with a wheel centrally mounted in bearings and having a grooved peripheral pressure-surface, and means for heating said wheel, of an inclosing ring having grooves on its inner face, passages communicating with said grooves, parallel endless cloths, means for feeding material between said cloths, means for guiding said cloths into the space between said wheel and ring, means for removing said cloths therefrom, means for separating said cloths from said pressed material, and means for pressing said wheel toward said ring, substantially as described.

9. In a rotary press, the combination of a pressure-wheel, a pressure-ring coöperating therewith and encircling said wheel eccentrically, means for forcing said wheel toward said ring, and automatically-operating devices for cutting off the action of said means before the pressure-surfaces of said ring and wheel have been brought into actual contact, substantially as described.

10. In a rotary press, the combination of a pressure-wheel, means for heating the same, a pressure-ring coöperating therewith and encircling said wheel eccentrically, devices for forcing said wheel toward said ring, and automatically-operating means for cutting off the action of said devices before the pressure-surfaces of said ring and wheel have been brought into actual contact, substantially as described.

11. In a rotary press, the combination of a pressure-wheel, a pressure-ring coöperating therewith and encircling said wheel eccentrically, means for forcing said wheel toward said ring, automatically-operating devices for cutting off the action of said means before the pressure-surfaces of said ring and wheel have been brought into actual contact, means for feeding the material into the space between said wheel and ring, and means for rotating said ring, substantially as described.

12. In a rotary press, the combination of a pressure-wheel having a grooved pressure-surface, means for heating said wheel from the interior thereof, a ring eccentrically encircling said wheel and having a bearing-surface adapted to enter the groove in said wheel, means for forcing said wheel toward said ring, an automatic stop which prevents said wheel from being forced into absolute contact with said ring, parallel endless cloths for feeding the material into the machine, and means for supporting and moving said ring and said cloths, substantially as described.

13. In a rotary press, the combination of a pressure-wheel having a grooved peripheral bearing-surface, a ring eccentrically encircling said wheel and having a bearing-surface adapted to enter the groove in said wheel, said ring being provided with apertures arranged out of parallel with the edges of said ring, means for feeding the material into the space between said wheel and ring, and means for rotating said ring, substantially as described.

14. In a rotary press, the combination with a pressure-wheel having a grooved peripheral pressing-surface, and means for heating said wheel, of a ring eccentrically encircling said wheel and having an inner pressure-surface adapted to enter the groove in said wheel, said inner pressure-surface being provided with grooves arranged out of parallel with the edge of the wheel for the discharge of the expressed liquid, means for feeding the material to be treated into the space between said wheel and ring, and means for supporting and rotating said ring, substantially as described.

15. In a rotary press, the combination of a pressure-wheel and a pressure-ring, said ring encircling said wheel eccentrically, two parallel endless cloths for receiving the material and feeding it into the space between said wheel and ring, and means for driving said cloths and separating them from the cake of compressed material after the pressing operation, substantially as described.

16. In a rotary press, the combination of a pressure-wheel and a ring encircling said wheel eccentrically, of two parallel cloths for feeding the material into the space between said ring, and means for supporting and driving said cloths and turning them after each passage through said press, substantially as described.

17. In a rotary press, the combination of a pressure-wheel, means for heating the same, a ring eccentrically encircling said wheel, parallel endless cloths for feeding the material to said press, means for supporting and driving said cloths and turning them after each passage through the press, and means for cleaning said cloths after each passage through the press, substantially as described.

18. In a rotary press, the combination of a pressure-wheel and a pressure-ring encircling said wheel eccentrically, said ring being provided with a spiral groove in its interior and with drainage means, substantially as described.

In testimony whereof I affix my signature in presence of two witnesses.

THADDEUS S. GRIMES.

Witnesses:
 EDWARD R. AUSTIN,
 WM. A. FULLER, Jr.